(12) United States Patent
Adachi

(10) Patent No.: US 9,936,461 B2
(45) Date of Patent: Apr. 3, 2018

(54) COMMUNICATION DEVICE AND COMMUNICATION METHOD

(75) Inventor: Takahiro Adachi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 262 days.

(21) Appl. No.: 13/988,420

(22) PCT Filed: Dec. 1, 2011

(86) PCT No.: PCT/JP2011/077775
§ 371 (c)(1),
(2), (4) Date: May 20, 2013

(87) PCT Pub. No.: WO2012/074041
PCT Pub. Date: Jun. 7, 2012

(65) Prior Publication Data
US 2013/0244717 A1 Sep. 19, 2013

(30) Foreign Application Priority Data
Dec. 3, 2010 (JP) .................................. 2010-270078

(51) Int. Cl.
| | | |
|---|---|---|
| *H04W 52/18* | (2009.01) | |
| *H04L 1/00* | (2006.01) | |
| *H04L 27/00* | (2006.01) | |
| *H04L 27/20* | (2006.01) | |
| *H04L 27/36* | (2006.01) | |
| *H04W 52/26* | (2009.01) | |

(52) U.S. Cl.
CPC ........... *H04W 52/18* (2013.01); *H04L 1/0003* (2013.01); *H04L 27/0008* (2013.01); *H04L 27/20* (2013.01); *H04L 27/36* (2013.01); *H04W 52/262* (2013.01)

(58) Field of Classification Search
CPC .. H04W 52/18; H04W 52/226; H04L 1/0003; H04L 27/0008; H04L 27/20; H04L 27/36
USPC .......................................... 455/522; 370/318
See application file for complete search history.

(56) References Cited

U.S. PATENT DOCUMENTS

| | | | |
|---|---|---|---|
| 7,330,698 B1 * | 2/2008 | Bolt et al. | ..................... 455/63.1 |
| 2002/0142732 A1 | 10/2002 | Asano | |

(Continued)

FOREIGN PATENT DOCUMENTS

| | | |
|---|---|---|
| JP | 7321579 A | 12/1995 |
| JP | 2002-290246 A | 10/2002 |

(Continued)

OTHER PUBLICATIONS

International Search Report for PCT/JP2011/077775 dated Feb. 7, 2012.

(Continued)

*Primary Examiner* — Raymond Dean
(74) *Attorney, Agent, or Firm* — Sughrue Mion, PLLC

(57) ABSTRACT

A communication device, which performs wireless communication according to an adaptive modulation scheme, includes a modulator that modulates data to be transmitted to generate a transmission signal, and a transmission power control unit that controls a transmission power of the transmission signal, wherein, when the modulation level increases according to the adaptive modulation scheme, the transmission power control unit starts control of the transmission power before the modulator increases the modulation level.

16 Claims, 6 Drawing Sheets

(56) References Cited

U.S. PATENT DOCUMENTS

| | | | |
|---|---|---|---|
| 2003/0043732 A1* | 3/2003 | Walton et al. ............... 370/208 |
| 2004/0100920 A1* | 5/2004 | Ball ..................... H04W 52/04 |
| | | | 370/318 |
| 2005/0118971 A1* | 6/2005 | Arai et al. ................ 455/232.1 |
| 2006/0023624 A1* | 2/2006 | Han ..................... H04L 1/0003 |
| | | | 370/204 |
| 2009/0305735 A1 | 12/2009 | Sasaki et al. |
| 2013/0003806 A1* | 1/2013 | Adachi .............. H04L 27/0008 |
| | | | 375/224 |

FOREIGN PATENT DOCUMENTS

| | | |
|---|---|---|
| JP | 2005-086593 A | 3/2005 |
| JP | 2005236709 A | 9/2005 |
| JP | 2006-041959 A | 2/2006 |
| WO | 2007/138796 A1 | 12/2007 |

OTHER PUBLICATIONS

Communication dated Sep. 4, 2017, from the European Patent Office in counterpart European Application No. 11844343.1.

\* cited by examiner

*FIG. 3*

| MODULATION SCHEME | ATTENUATION RATE |
|---|---|
| QPSK | x1 |
| 16QAM | x2 |
| ⋮ | ⋮ |

COMMUNICATION DEVICE AND COMMUNICATION METHOD

TECHNICAL FIELD

The present invention relates technology for changing a modulation scheme according to an adaptive modulation scheme.

BACKGROUND ART

Technology for performing optimal wireless communication includes an adaptive modulation scheme of changing a modulation scheme according to a state of a propagation path. Technology for changing a transmission power according to a used modulation scheme in the adaptive modulation scheme has been proposed. As a specific example, a communication method in a wireless communication system having a transmission-side communication device and a receiving-side communication device, i.e., communication technology characterized in that the transmission-side communication device controls a transmission power of a transmission signal based on a modulation level is described, for example, in Patent Document 1. Further, in recent years, higher quality communication is required, in which the wireless communication does not cause an error even in a very short period of time.

DOCUMENT OF PRIOR ART

Patent Document

Patent Document 1: Japanese Unexamined Patent Application Publication No. 2005-086593

DISCLOSURE OF INVENTION

Problem to be Solved by the Invention

In the adaptive modulation scheme as described above, it is necessary to set a low maximum transmission power so as not to generate bit errors since a high level modulation scheme generally has low resistance to distortion of a signal.

Accordingly, if a modulation scheme is changed to a high level modulation scheme in a state in which a maximum transmission power in a low level modulation scheme is set in changing a modulation scheme, a transmission power is likely to exceed the maximum transmission power with which the bit error is not caused in the modulation scheme. Under such a condition, the bit error easily occurs due to distortion occurring in modulation waves after power amplification. Thus, if a timing to change the modulation scheme and a timing to change settings of the transmission power are not accurately adjusted, e.g. by reversing the timing sequence, a transmission power is likely to exceed the maximum transmission power even in a very short period of time. In this case, there is a possibility of bit errors being generated. In view of the above circumstances, an object of the present invention is to provide technology for reducing bit errors caused by distortion occurring in modulation waves when a modulation scheme is changed in a direction in which the modulation level increases.

Means for Solving the Problem

An aspect of the present invention is a communication device that performs wireless communication according to an adaptive modulation scheme, the communication device including: a modulator that modulates data to be transmitted to generate a transmission signal; and a transmission power control unit that controls a transmission power of the transmission signal, wherein, when the modulation level increases according to the adaptive modulation scheme, the transmission power control unit starts control of the transmission power before the modulator increases the modulation level.

An aspect of the present invention is a communication method of performing wireless communication according to an adaptive modulation scheme, the communication method including: a modulation step of modulating data to be transmitted to generate a transmission signal; and a transmission power control step of controlling a transmission power of the transmission signal, wherein, when the modulation level increases according to the adaptive modulation scheme, control of the transmission power starts in the transmission power control step before the modulation level increases in the modulation step.

Effect of the Invention

According to the present invention, it is possible to reduce the bit error caused by distortion occurring in modulation waves when the modulation scheme is changed in a direction in which the modulation level increases.

BRIEF DESCRIPTION OF THE DRAWINGS

FIG. 3 is a diagram illustrating a specific example of an attenuation rate table used in an embodiment of the present invention.

EMBODIMENTS FOR CARRYING OUT THE INVENTION

Figure 1:
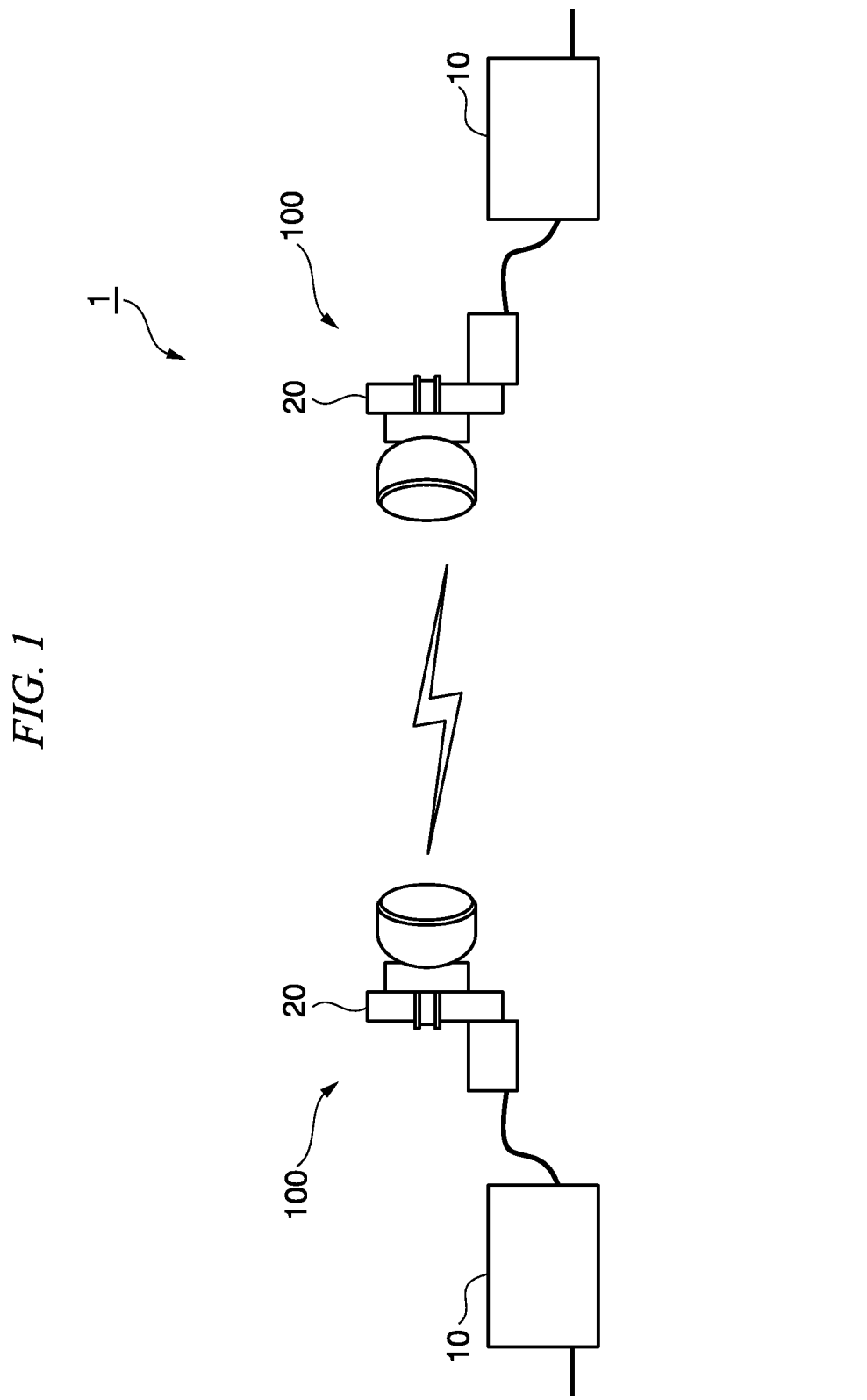
FIG. 1 is a system configuration diagram illustrating a system configuration of a communication system of an embodiment of the present invention.

FIG. 1 is a system configuration diagram illustrating a system configuration of a communication system 1. A communication system 1 includes a plurality of communication devices 100 that face each other. Here, the communication devices 100 of a fixed type using wireless communication of microwaves or the like are shown. Further, a configuration of the communication system 1 illustrated in FIG. 1 is only an example. For example, the one communication device 100 may be a mobile phone or a wireless LAN terminal device, and the other communication device 100 may be a mobile phone base station and a wireless LAN base station.

Each communication device 100 includes an IDU (Indoor Unit) 10 and an ODU (Outdoor Unit) 20. The ODU 20 includes an antenna for transmitting and receiving radio waves. The communication device 100 performs wireless communication by transmitting and receiving the radio waves from the antenna. Each antenna may perform transmission and reception, for example, using microwaves with directivity as a carrier. When the microwaves are used as a carrier, antennas are disposed so as to face each other. Further, each antenna may transmit and receive radio waves with low directivity. In this case, it is unnecessary for the antennas to be disposed so as to face each other.

Figure 2:
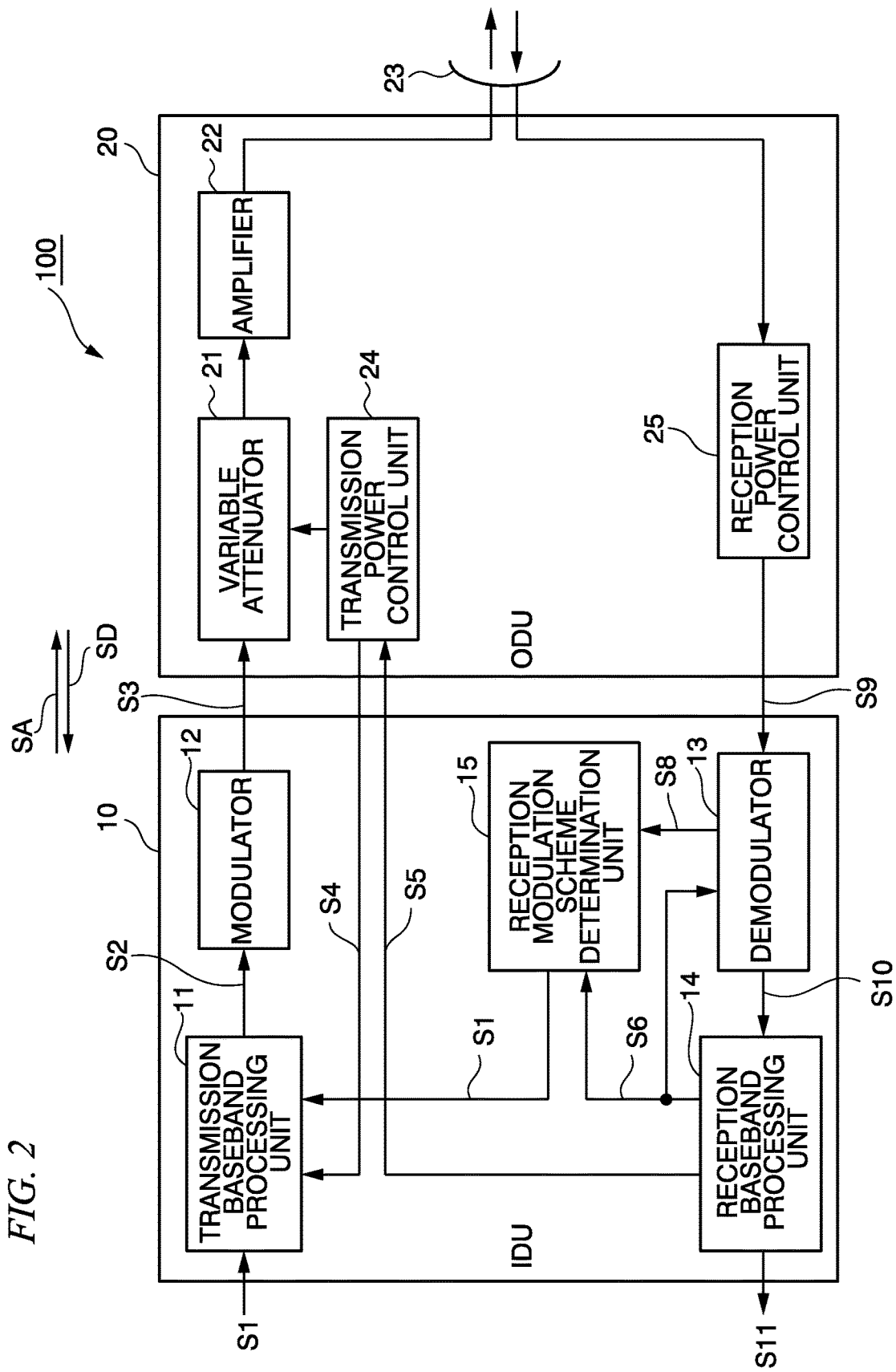
FIG. 2 is a diagram illustrating a functional block of communication device of an embodiment of the present invention.

Next, a configuration of the communication device 100 will be described in detail. In the following description, communication in which transmission from the own device to the other communication device 100 is performed is called "uplink communication SA" and communication in which the own device receives a signal from the other communication device 100 is called "downlink communication SD." FIG. 2 is a diagram illustrating a functional block of the communication device 100. The IDU 10 includes a transmission baseband processing unit 11, a modulator 12, a demodulator 13, a reception baseband processing unit 14, and a reception modulation scheme determination unit 15. The ODU 20 includes a variable attenuator 21, an amplifier 22, an antenna 23, a transmission power control unit 24, and a reception power control unit 25.

The transmission baseband processing unit 11 receives input of data (input data S1) that is a transmission target. The input data S1 may be data generated in the communication device 100 or may be data input from another device connected to the communication device 100.

The transmission baseband processing unit 11 multiplexes the input data with determined modulation scheme information notified of by the reception modulation scheme determination unit 15 and IDU transmission modulation scheme control information S4 notified of by the transmission power control unit 24. The determined modulation scheme information notified of by the reception modulation scheme determination unit 15 is information indicating a modulation scheme used in downlink communication (hereinafter referred to as "downlink modulation scheme information"). The IDU transmission modulation scheme control information notified of by the transmission power control unit 24 is information indicating a modulation scheme used in uplink communication (hereinafter referred to as "uplink modulation scheme information"). The transmission baseband processing unit 11 sends data in which the input data is multiplexed with the determined modulation scheme information and the IDU transmission modulation scheme control information (hereinafter referred to as "transmission radio frame data S2") to the modulator 12.

The modulator 12 reads the IDU transmission modulation scheme control information from the transmission radio frame data.

Further, the modulator 12 modulates the transmission radio frame data using the modulation scheme according to the read IDU transmission modulation scheme control information to generate a transmission signal S3. The modulator 12 sends the generated signal to the variable attenuator 21.

The variable attenuator 21 changes the transmission power under control of the transmission power control unit 24. The variable attenuator 21 may change the transmission power. For example, the variable attenuator 21 may change the transmission power by changing a voltage level, or may change the transmission power by changing a current value. In the following description, the variable attenuator 21 attenuates a voltage level of a transmission signal input to the amplifier 22 according to the control of the transmission power control unit 24.

The transmission power control unit 24 controls the variable attenuator 21 according to the ODU transmission modulation scheme control information S5 notified of by the reception baseband processing unit 14 to control the transmission power. Hereinafter, a specific example of a process of the transmission power control unit 24 will be described. The transmission power control unit 24 stores a predetermined attenuation rate table. The transmission power control unit 24 determines an attenuation rate according to a modulation scheme of the ODU transmission modulation scheme control information notified of by the reception baseband processing unit 14 based on the predetermined attenuation rate table. Also, the transmission power control unit 24 controls the variable attenuator 21 to have the determined attenuation rate. Further, the transmission power control unit 24 notifies the transmission baseband processing unit 11 of the ODU transmission modulation scheme control information notified by the reception baseband processing unit 14 as the IDU transmission modulation scheme control information.

A timing at which the transmission power control unit 24 changes an attenuation rate of the variable attenuator 21 and a timing at which the transmission power control unit 24 changes the modulation scheme of the IDU transmission modulation scheme control information vary according to a change in the modulation level. When a modulation level of newly notified ODU transmission modulation scheme control information is higher than a modulation level of the ODU transmission modulation scheme control information notified of up to that time point (hereinafter referred to as "when the level increases"), the transmission power control unit 24 first starts a change of the attenuation rate of the variable attenuator 21 and then changes the modulation scheme of the IDU transmission modulation scheme control information. On the other hand, when the modulation level in the newly notified ODU transmission modulation scheme control information is lower than the modulation level of the ODU transmission modulation scheme control information notified of up to that time point (hereinafter referred to as "when the level decreases"), the transmission power control unit 24 changes the modulation scheme of the IDU transmission modulation scheme control information and then starts to change the attenuation rate of the variable attenuator 21.

The amplifier 22 is an amplifier with a fixed gain. The amplifier 22 amplifies the voltage level of the transmission signal attenuated by the variable attenuator 21 with a predetermined gain.

The antenna 23 transmits the signal amplified by the amplifier 22 into the air as radio waves.

Further, the antenna 23 receives the signal transmitted from the other communication device 100. In the following description, the signal received by the antenna 23 is referred to as a "reception signal." The signal (the reception signal) received by the antenna 23 is input to the reception power control unit 25.

The reception power control unit 25 controls a voltage level of the reception signal to a predetermined voltage level. The reception signal whose voltage level has been controlled by the reception power control unit 25 is input to the demodulator 13.

The demodulator 13 demodulates the reception signal S9 using the modulation scheme according to the reception modulation scheme control information notified of by the reception baseband processing unit 14 to generate reception radio frame data S10. The demodulator 13 sends the generated reception radio frame data to the reception baseband processing unit 14. The reception radio frame data generated by demodulator 13 is the same data as the transmission radio frame data generated by the transmission baseband processing unit 11 of the communication device 100 that is a transmission source if no error occurs.

Further, the demodulator 13 generates CNR information for the reception signal (reception CNR information).

The CNR information refers to information on the CNR (Carrier vs. Noise Ratio) of the reception signal.

The demodulator 13 notifies the reception modulation scheme determination unit 15 of the generated reception CNR information.

The reception baseband processing unit 14 extracts the data that is a transmission target in the communication device 100 that is the transmission source, from the reception radio frame data. Also, the reception baseband processing unit 14 outputs the extracted data (output data S11). An output destination of the data may be an information processing function included in the communication device 100 or may be another information processing device connected to the communication device 100.

Further, the reception baseband processing unit 14 extracts the reception modulation scheme information from the reception radio frame data. This reception modulation scheme information is IDU transmission modulation scheme control information multiplexed in the communication device 100 of a signal transmission source, and is information indicating the modulation scheme used by the modulator 12 of the communication device 100 that is the transmission source. The reception baseband processing unit 14 notifies the demodulator 13 and the reception modulation scheme determination unit 15 of the extracted reception modulation scheme control information S6.

Further, the reception baseband processing unit 14 extracts the determined modulation scheme information from the reception radio frame data. This determined modulation scheme information is the determined modulation scheme information S7 multiplexed in the communication device 100 of the signal transmission source and is information indicating the modulation scheme determined by the reception modulation scheme determination unit 15 of the transmission source. The reception baseband processing unit 14 notifies the transmission power control unit 24 of the extracted determined modulation scheme information as the ODU transmission modulation scheme control information.

The reception modulation scheme determination unit 15 determines the modulation scheme to be used for downlink communication based on the reception CNR information S8 notified of by the demodulator 13. Also, the reception modulation scheme determination unit 15 notifies the transmission baseband processing unit 11 of a determination result as the determined modulation scheme information.

FIG. 3 is a diagram illustrating a specific example of the attenuation rate table. The attenuation rate table is a table in which the modulation scheme and the attenuation rate are associated with each other in one-to-one correspondence. The modulation scheme of the attenuation rate table corresponds to the modulation scheme indicated by the ODU transmission modulation scheme control information notified by the reception baseband processing unit 14.

The attenuation rate of the attenuation rate table indicates an attenuation rate to be controlled by the variable attenuator 21. For example, if the notified ODU transmission modulation scheme control information is QPSK, the transmission power control unit 24 controls the variable attenuator 21 so that the attenuation rate becomes ×1.

Figure 4A:
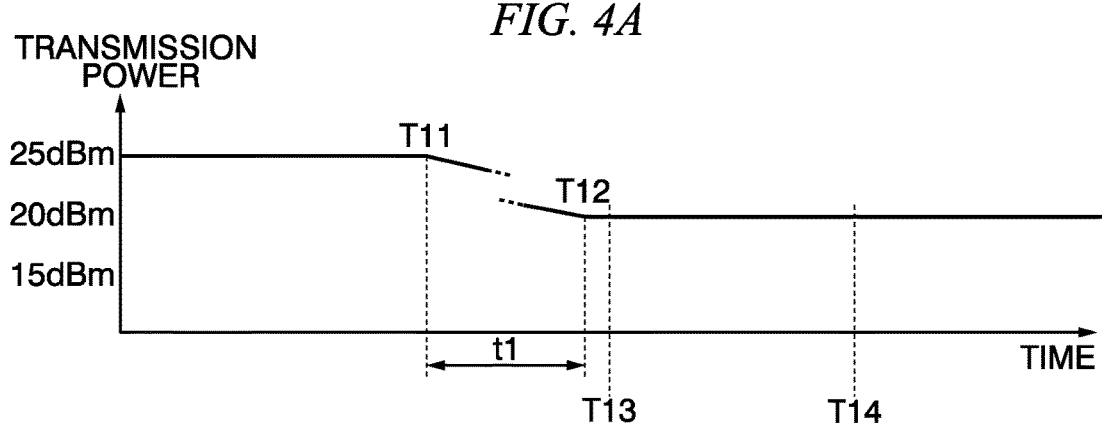
FIG. 4A is a diagram illustrating a timing of a process of a transmission power control unit when a level increases in an embodiment of the present invention.
Figure 4B:
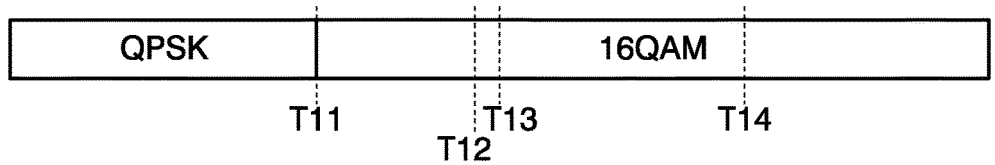
FIG. 4B is a diagram illustrating a timing of a process of a transmission power control unit when a level increases in an embodiment of the present invention.
Figure 4C:
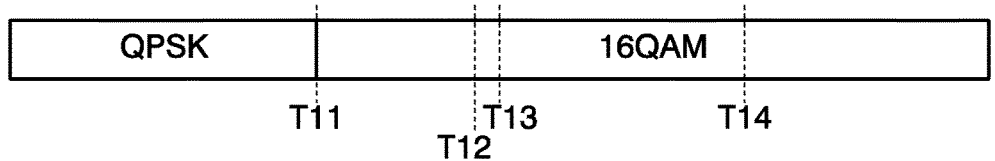
FIG. 4C is a diagram illustrating a timing of a process of a transmission power control unit when a level increases in an embodiment of the present invention.
Figure 4D:
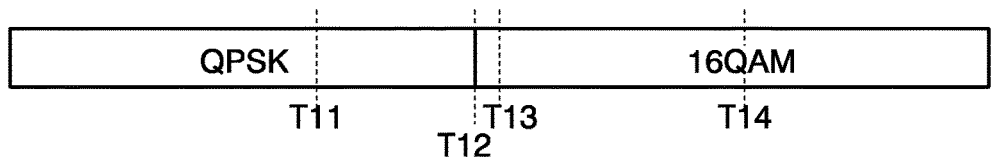
FIG. 4D is a diagram illustrating a timing of a process of a transmission power control unit when a level increases in an embodiment of the present invention.
Figure 4E:
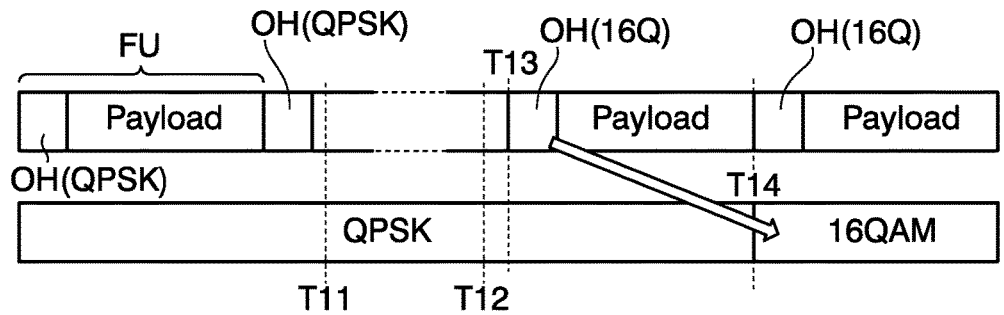
FIG. 4E is a diagram illustrating a timing of a process of a transmission power control unit when a level increases in an embodiment of the present invention.

FIGS. 4A to 4E are diagrams illustrating a timing of a process of the transmission power control unit 24 when the level increases. FIG. 4A illustrates a temporal variation of the voltage level of the transmission signal output from the amplifier 22. A vertical axis indicates the voltage level of the transmission signal and a horizontal axis indicates time. FIG. 4B illustrates a change in the modulation scheme indicated by the ODU transmission modulation scheme control information. FIG. 4C illustrates a change in the modulation scheme indicated by ODU interior modulation scheme control information. FIG. 4D illustrates a change in the modulation scheme indicated by the IDU transmission modulation scheme control information. FIG. 4E illustrates a temporal change in content of the transmission radio frame data input to the modulator 12, and a modulation scheme of a modulation process to be performed on the transmission radio frame data by the modulator 12. FU indicates a radio frame unit (a few μs). Horizontal axes of FIGS. 4A to 4E indicate the same time axis. The ODU interior modulation scheme control information is control information used for the transmission power control unit 24 to control a timing of its own process, and is information indicating a modulation scheme corresponding to a transmission power controlled at that time. For example, when the ODU interior modulation scheme control information is QPSK, the transmission power control unit 24 performs control so that the transmission power becomes a power according to QPSK.

At a time point of a timing T11, when the modulation scheme indicated by the ODU transmission modulation scheme control information is changed from QPSK (Quadrature Phase Shift Keying) to 16 QAM (Quadrature Amplitude Modulation), the transmission power control unit 24 determines whether the modulation level has increased or decreased. In this case, the transmission power control unit 24 determines that the modulation level has increased. Accordingly, the transmission power control unit 24 first starts control of the variable attenuator 21 and then changes the modulation scheme of the IDU transmission modulation scheme control information in advance. That is, the transmission power control unit 24 first changes the ODU interior modulation scheme control information into the same value as the ODU transmission modulation scheme control information at a time point of T11. In other words, the transmission power control unit 24 changes the ODU interior modulation scheme control information from QPSK to 16 QAM. The transmission power control unit 24 starts the control to change the attenuation rate of the variable attenuator 21 based on the ODU interior modulation scheme control information. In this case, since the modulation level is changed into 16 QAM, the transmission power control unit 24 determines that the attenuation rate is changed into ×2 by referencing the attenuation rate table. Also, at a time point of T12 after a control process has been performed on the variable attenuator 21, the transmission power control unit 24 changes the IDU transmission modulation scheme control information to be notified to the transmission baseband processing unit 11 from QPSK to 16 QAM.

The timing T12 at which the transmission power control unit 24 changes the IDU transmission modulation scheme control information into a new modulation scheme may be determined as follows. For example, the transmission power control unit 24 may store a time (t1) required until the voltage level of the transmission signal output from the variable attenuator 21 converges on a value after control, in advance. A length of the time t1 may be appropriately set according to performance of the communication device 100 or the like and, for example, may be a few milliseconds or may be tens of milliseconds. After a time t1 has elapsed from start of the control of the attenuation rate of the variable attenuator 21, the transmission power control unit 24 changes the IDU transmission modulation scheme control information into a new modulation scheme.

Further, the timing T12 may be determined as follows. For example, the transmission power control unit 24 measures the voltage level of the transmission signal output from the variable attenuator 21 and determines whether the voltage level of the transmission signal output from the variable attenuator 21 converges on the value after control. Also, at a time point at which it is determined that the voltage level has converged on the value after control, the transmission power control unit 24 changes the modulation scheme of the IDU transmission modulation scheme control information. If the timing T12 is a timing after time has elapsed from the time point T11, the timing T12 may be implemented to be different from those of the two specific examples described above. For example, even when the voltage level does not converge on the value after control, a time required to reach such a voltage level that influence of signal distortion is negligible may be set as t1. Further, the transmission power control unit 24 may determine whether the voltage level has become such a voltage level. Further, the implementation may be done through other methods.

When the transmission power control unit 24 changes the modulation scheme of the IDU transmission modulation scheme control information in the timing T12, the modulation scheme multiplexed with the transmission radio frame data is accordingly changed by the transmission baseband processing unit 11 (a subsequent timing T13). The modulator 12 starts modulation according to the modulation scheme (16 QAM) after the change, from a timing T14 at which a next radio frame is modulated.

Figure 5A:
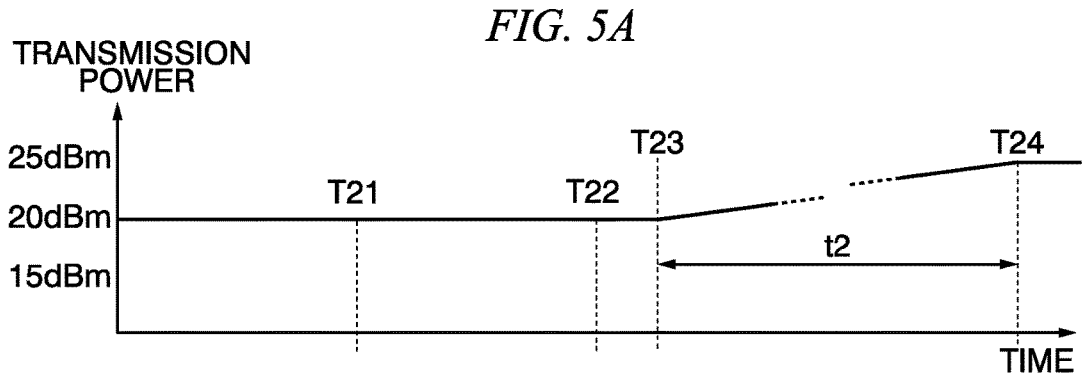
FIG. 5A is a diagram illustrating a timing of a process of a transmission power control unit when a level decreases in an embodiment of the present invention.
Figure 5B:
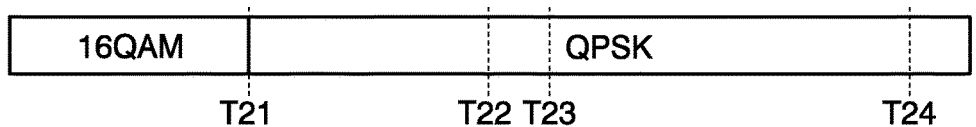
FIG. 5B is a diagram illustrating a timing of a process of a transmission power control unit when a level decreases in an embodiment of the present invention.
Figure 5C:
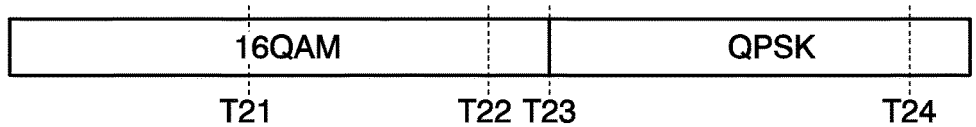
FIG. 5C is a diagram illustrating a timing of a process of a transmission power control unit when a level decreases in an embodiment of the present invention.
Figure 5D:
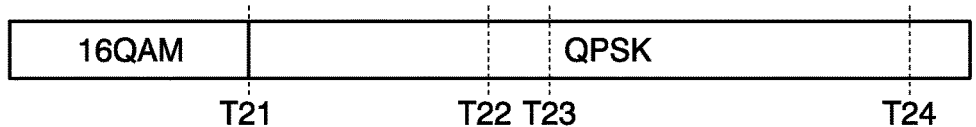
FIG. 5D is a diagram illustrating a timing of a process of a transmission power control unit when a level decreases in an embodiment of the present invention.
Figure 5E:
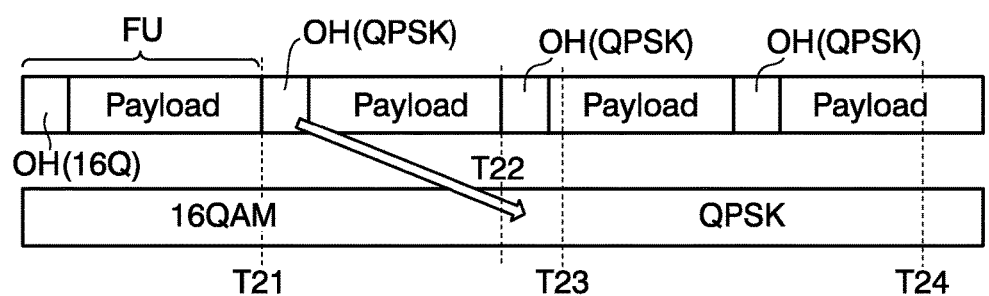
FIG. 5E is a diagram illustrating a timing of a process of a transmission power control unit when a level decreases in an embodiment of the present invention.

FIGS. 5A to 5E are diagrams illustrating a timing of the process of the transmission power control unit 24 when a level decreases. FIG. 5A indicates a temporal variation of a voltage level of a transmission signal output from the amplifier 22. A vertical axis indicates the voltage level of a transmission signal, and a horizontal axis indicates time. FIG. 5B indicates a change in modulation scheme indicated by the ODU transmission modulation scheme control information. FIG. 5C indicates a change in a modulation scheme indicated by the ODU interior modulation scheme control information. FIG. 5D indicates a change in a modulation scheme indicated by the IDU transmission modulation scheme control information. FIG. 5E indicates a temporal change in content of transmission radio frame data input to the modulator 12 and a modulation scheme of a modulation process performed on the transmission radio frame data by the modulator 12. FU indicates a radio frame unit (a few μs). The horizontal axes in FIGS. 5A to 5E indicate the same time axis.

At a time point of a timing T21, the modulation scheme indicated by the ODU transmission modulation scheme control information is changed from 16 QAM to QPSK, and the transmission power control unit 24 determines whether the modulation level has increased or decreased. In this case, the transmission power control unit 24 determines that the modulation level has decreased. Accordingly, the transmission power control unit 24 changes the modulation scheme of the IDU transmission modulation scheme control information and then starts control of the variable attenuator 21. In other words, the transmission power control unit 24 first changes the IDU transmission modulation scheme control information, which the transmission baseband processing unit 11 is notified of, from 16 QAM to QPSK at the time point of T21.

If the transmission power control unit 24 changes the modulation scheme of the IDU transmission modulation scheme control information, the modulation scheme multiplexed with the transmission radio frame data is correspondingly changed by the transmission baseband processing unit 11. The modulator 12 starts modulation according to the modulation scheme (QPSK) after the change from a timing T22 at which a next radio frame is modulated. Then, in a timing T23, the transmission power control unit 24 changes the ODU interior modulation scheme control information into the same value as the ODU transmission modulation scheme control information. In other words, the transmission power control unit 24 changes the ODU interior modulation scheme control information from 16 QAM to QPSK. The transmission power control unit 24 starts control to change the attenuation rate of the variable attenuator 21 based on the ODU interior modulation scheme control information. In this case, since the modulation level is changed into QPSK, the transmission power control unit 24 determines that the attenuation rate is changed into ×1 by referencing the attenuation rate table. Then, at a timing T24, the voltage level of the transmission signal output from the variable attenuator 21 converges and the voltage level of the transmission signal output from the amplifier 22 converges on 25 dBm.

Digital microwave communication is vulnerable to distortion in a multilevel modulation scheme, and it is necessary to lower the voltage level of the transmission signal. Therefore, it is possible to realize wireless communication with low bit error caused by distortion by performing control to lower the voltage level of the transmission signal at the time of increase in the level. However, if the modulation scheme is switched prior to control of lowering the voltage level, the bit error caused by the distortion may occur until the voltage level is lowered. Such a problem is not a problem confined to digital microwave communication but is a common problem in wireless communication.

For such problems, the communication device 100 first starts control of the voltage level of the transmission signal as shown in FIGS. 4A to 4E and then changes the modulation scheme. Therefore, it is possible to reduce the bit error caused by the distortion occurring in the transmission signal.

Further, since the modulation scheme is changed into a modulation scheme more resistant to distortion when the level decreases, it is less necessary to start control of the voltage level prior to the change of the modulation scheme as described above. Rather, it takes much time to complete the change of the modulation scheme by first starting the control of the voltage level and then changing the modulation scheme. Accordingly, a problem is generated in that rapid degradation of a reception electric field cannot be followed. For such a problem, the communication device 100 performs the control of the voltage level of the transmission signal and the change of the modulation scheme, as shown in FIGS. 5A to 5E, substantially at the same time. Accordingly, it is possible to shorten a time to complete the change of the modulation scheme as compared to when the level increases, and to follow rapid degradation of the reception field.

Further, the transmission power control unit 24 controls the voltage level of the transmission signal transmitted from the antenna 23 by controlling the variable attenuator 21. Thus, since the amplifier 22 is not controlled but the attenuator 21 arranged in a preceding stage of the amplifier 22 is controlled, it is possible to further shorten the time required for the control.

MODIFIED EXAMPLE

Information that the demodulator 13 notifies the reception modulation scheme determination unit 15 of need not be limited to the information on the CNR if the information is information indicating communication quality of downlink communication. For example, the information may be information on a voltage level of the reception signal.

The transmission power control unit 24 may control the voltage level of the transmission signal by controlling the gain of the amplifier 22 instead of controlling the attenuation rate of the variable attenuator 21. In this case, the amplifier 22 is a variable amplifier with a variable gain. Further, the variable attenuator 21 may be an attenuator with a fixed attenuation rate. Further, the transmission power control unit 24 may control the voltage level of the transmission signal by controlling both the variable attenuator 21 and the amplifier 22.

The transmission power control unit 24 may store an attenuated voltage level table instead of the attenuation rate table. The attenuated voltage level table indicates, for each modulation scheme, the voltage level of the transmission signal that has been attenuated by the variable attenuator 21. In this case, the transmission power control unit 24 controls the variable attenuator 21 so that the voltage level of the transmission signal output from the variable attenuator 21 becomes a voltage level indicated in the attenuated voltage level table.

The transmission power control unit 24 may store a transmission voltage level table instead of the attenuation rate table. The transmission voltage level table indicates, for each modulation scheme, the voltage level of the transmission signal that has been amplified by the amplifier 22. In this case, the transmission power control unit 24 controls the variable attenuator 21 so that the voltage level of the transmission signal output from the amplifier 22 becomes a voltage level indicated in the transmission voltage level table.

Figure 6:
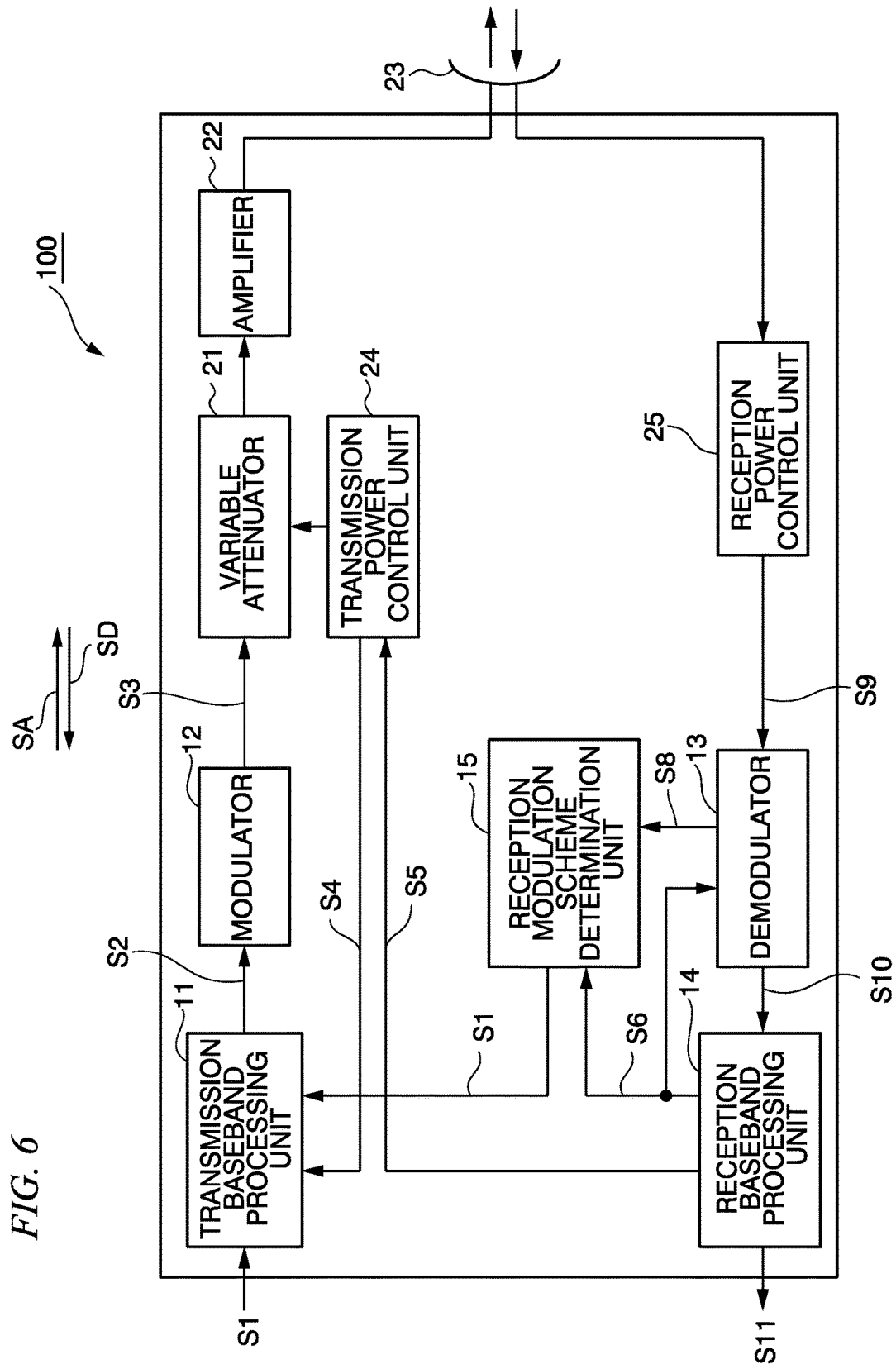
FIG. 6 is a diagram illustrating a modified example of the configuration of the communication device of an embodiment of the present invention.

FIG. 6 is a diagram illustrating a modified example of the configuration of the communication device 100. As shown in FIG. 6, the IDU 10 and the ODU 20 of the communication device 100 may be integrally formed. For respective signals and components shown in FIG. 2, the same reference numerals are used in FIG. 6.

In the communication device 100 described above, the voltage level of the transmission signal was fixed according to the modulation level. On the other hand, the voltage level of the transmission signal may not be fixed according to the modulation level. For example, the voltage level of the transmission signal may be determined according to ATPC (Automatic Transmitter Power Control). In this case, the reception baseband processing unit 14 extracts information on the voltage level multiplexed with reception radio frame data and notifies the transmission power control unit 24 of the information. The transmission power control unit 24 controls the attenuation rate of the variable attenuator 21 so that the voltage level of the transmission signal becomes the notified voltage level.

While the embodiments of the present invention have been described in detail with reference to the drawings, a specific configuration is not limited to the embodiments and includes designs without departing from the spirit and scope of the present invention.

This application claims the priority of Japanese Patent Application No. 2010-270078, filed Dec. 3, 2010, the disclosure of which is hereby incorporated herein by reference in its entirety.

INDUSTRIAL APPLICABILITY

When the modulation scheme is changed in a direction in which the modulation level increases, it is possible to reduce the bit error caused by the distortion occurring in the modulation waves.

DESCRIPTION OF REFERENCE SYMBOLS

10 IDU
11 transmission baseband processing unit
12 modulator
13 demodulator
14 reception baseband processing unit
15 reception modulation scheme determination unit
20 ODU
21 variable attenuator (transmission power changing unit)
22 amplifier (transmission power changing unit)
23 antenna
24 transmission power control unit
25 reception power control unit

The invention claimed is:

1. A communication device that performs wireless communication according to an adaptive modulation scheme, the communication device comprising:
   a modulator configured to modulate data to be transmitted to generate a transmission signal at a modulation level; and
   a transmission power controller configured to control a transmission power of the transmission signal,
   wherein the modulation level is determined to be increased to a target level, and the transmission power is decreased to correspond to the target level before the modulation level is increased to the target level.

2. The communication device according to claim 1, wherein the modulation level decreases according to the adaptive modulation scheme, and the transmission power controller is further configured to start control of the transmission power after the modulator decreases the modulation level.

3. The communication device according to claim 1, further comprising a variable attenuator that attenuates the transmission power of the transmission signal; and
an amplifier that amplifies the transmission power of the transmission signal whose transmission power has been attenuated by the variable attenuator,
wherein the transmission power controller is further configured to control the transmission power of the transmission signal by controlling an attenuation rate of the variable attenuator.

4. A communication method of performing wireless communication according to an adaptive modulation scheme, the communication method comprising:
a modulation step of modulating data to be transmitted to generate a transmission signal at a modulation level; and
controlling a transmission power of the transmission signal,
wherein the modulation level is determined to be increased to a target level, and the transmission power is decreased to correspond to the target level before the modulation level is increased to the target level.

5. The communication method according to claim 4, wherein the modulation level decreases according to the adaptive modulation scheme, and the transmission power controlling starts after the modulation level decreases in the modulation step.

6. The communication device of claim 1, wherein the modulation level is increased to the target level in response to the transmission power reaching a predetermined transmission power level.

7. The communication device of claim 1, wherein the modulation level is increased to the target level before a subsequent increase in the transmission power.

8. The communication device according to claim 1, wherein, the transmission power is decreased in response to the determination to increase the modulation level.

9. The communication method according to claim 4, wherein, the decreasing the transmission power comprises decreasing the transmission power in response to the determining to increase the modulation level.

10. A communication device that performs wireless communication according to an adaptive modulation scheme, the communication device comprising:
a modulator configured to modulate data to be transmitted to generate a transmission signal at a modulation level; and
a transmission power controller configured to control a transmission power of the transmission signal,
wherein the modulation level is determined to be increased to a target level, and the transmission power is decreased to correspond to the target level before the data is modulated at the target level.

11. The communication device according to claim 1, wherein when the modulation level is determined to be increased to the target level and the transmission power is decreased to correspond to the target level, the transmission power is not determined based on a quality of a reception signal.

12. The communication device according to claim 1, wherein the transmission power controller is further configured to control the transmission power based on a quality of a reception signal.

13. The communication device according to claim 12, wherein the transmission power controller is further configured to control the transmission power based on the quality of the reception signal while the data is being modulated at the target level.

14. The communication device according to claim 1, wherein
the transmission power controller is further configured to control the transmission power based on a quality of a reception signal, and
when the modulation level is determined to be increased to the target level and the transmission power is decreased to correspond to the target level, the transmission power is not determined based on the quality of the reception signal.

15. A communication method of performing wireless communication according to an adaptive modulation scheme, the communication method comprising:
a modulation step of modulating data to be transmitted, thereby generating a transmission signal at a modulation level;
determining to increase the modulation level to a target level;
controlling a transmission power of the transmission signal,
wherein the controlling comprises decreasing the transmission power to correspond to the target level, and after the decreasing the transmission power, increasing the modulation level to the target level.

16. The communication method according to claim 15, further comprising decreasing the modulation level according to the adaptive modulation scheme,
wherein the controlling the transmission power starts after the decreasing the modulation level.

* * * * *